United States Patent
Xiao et al.

(10) Patent No.: US 10,827,493 B2
(45) Date of Patent: Nov. 3, 2020

(54) DEVICE, NETWORK, AND METHOD FOR WIDEBAND LONG-TERM EVOLUTION (LTE) UPLINK TRANSMISSION

(71) Applicant: Futurewei Technologies, Inc., Plano, TX (US)

(72) Inventors: Weimin Xiao, Hoffman Estates, IL (US); Qian Cheng, Naperville, IL (US); Philippe Sartori, Plainfield, IL (US); Lukasz Krzymien, Rolling Meadows, IL (US); Jialing Liu, Palatine, IL (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/259,855

(22) Filed: Jan. 28, 2019

(65) Prior Publication Data
US 2019/0159208 A1 May 23, 2019

Related U.S. Application Data

(63) Continuation of application No. 15/165,649, filed on May 26, 2016, now Pat. No. 10,206,211.

(60) Provisional application No. 62/171,061, filed on Jun. 4, 2015.

(51) Int. Cl.
| | |
|---|---|
| *H04W 4/00* | (2018.01) |
| *H04W 72/04* | (2009.01) |
| *H04L 5/00* | (2006.01) |
| *H04L 27/26* | (2006.01) |
| *H04B 7/0413* | (2017.01) |

(52) U.S. Cl.
CPC ....... *H04W 72/0453* (2013.01); *H04L 5/0055* (2013.01); *H04L 27/2636* (2013.01); *H04B 7/0413* (2013.01)

(58) Field of Classification Search
None
See application file for complete search history.

(56) References Cited

U.S. PATENT DOCUMENTS

| | | | |
|---|---|---|---|
| 2007/0206559 A1* | 9/2007 | Cho | ........... H04L 5/0037 370/344 |
| 2008/0032630 A1 | 2/2008 | Kim et al. | |
| 2008/0298316 A1 | 12/2008 | Bitran et al. | |

(Continued)

FOREIGN PATENT DOCUMENTS

| | | |
|---|---|---|
| CN | 101502069 A | 8/2009 |
| CN | 101742665 A | 6/2010 |

(Continued)

*Primary Examiner* — Phirin Sam
(74) *Attorney, Agent, or Firm* — Slater Matsil, LLP

(57) ABSTRACT

A method for receiving wideband (WB) LTE uplink signals. A base station may signal a first frequency tone assignment to a first user equipment (UE), the first frequency tone assignment scheduling at least a first set of subcarriers allocated to the first UE, subcarriers in the first set of subcarriers being non-contiguous in the frequency domain. Subcarriers in the first set of subcarriers may be interleaved with subcarriers in a second set of subcarriers. The first UE may perform a first single carrier frequency division multiple access (SC-FDMA) uplink transmission over the first set of subcarriers. A second UE may perform a second SC-FDMA uplink transmission, the second SC-FDMA uplink transmission spanning the second set of subcarriers.

22 Claims, 5 Drawing Sheets

(56) References Cited

U.S. PATENT DOCUMENTS

| | | |
|---|---|---|
| 2010/0034186 A1 | 2/2010 | Zhou et al. |
| 2010/0091919 A1 | 4/2010 | Xu et al. |
| 2010/0120442 A1 | 5/2010 | Zhuang et al. |
| 2010/0195824 A1 | 8/2010 | Lin et al. |
| 2010/0246561 A1* | 9/2010 | Shin ............... H04W 52/32 370/345 |
| 2010/0279707 A1 | 11/2010 | Fischer et al. |
| 2011/0158211 A1* | 6/2011 | Gaal ............... H04L 27/2647 370/338 |
| 2012/0014339 A1 | 1/2012 | Bitran et al. |
| 2012/0178463 A1 | 7/2012 | Lin et al. |
| 2013/0142139 A1 | 6/2013 | Ktazoe et al. |
| 2013/0188505 A1 | 7/2013 | Nory et al. |
| 2013/0286853 A1 | 10/2013 | Shi et al. |
| 2014/0064240 A1* | 3/2014 | Dinan ............... H04W 72/0406 370/330 |
| 2014/0273914 A1* | 9/2014 | Mechaley, Jr. ........ H04W 4/90 455/404.1 |
| 2014/0362701 A1 | 12/2014 | Roh et al. |
| 2014/0365648 A1 | 12/2014 | Roh et al. |
| 2015/0304017 A1 | 10/2015 | Zhuang et al. |
| 2015/0304089 A1 | 10/2015 | Kim et al. |
| 2015/0358190 A1 | 12/2015 | Kruglick et al. |
| 2016/0226605 A1 | 8/2016 | Olney |
| 2016/0254889 A1* | 9/2016 | Shattil ............... H04L 5/0035 370/329 |
| 2016/0286455 A1 | 9/2016 | Zhang et al. |
| 2017/0026977 A1* | 1/2017 | Gaal ............... H04W 72/0453 |
| 2017/0078058 A1 | 3/2017 | Marinier et al. |
| 2017/0238309 A1* | 8/2017 | Han ............... H04L 1/1671 370/335 |
| 2017/0366380 A1* | 12/2017 | Hwang ............... H04L 5/0055 |

FOREIGN PATENT DOCUMENTS

| | | |
|---|---|---|
| CN | 102349329 A | 2/2012 |
| CN | 102595659 A | 7/2012 |
| CN | 104054297 A | 9/2014 |

* cited by examiner

DEVICE, NETWORK, AND METHOD FOR WIDEBAND LONG-TERM EVOLUTION (LTE) UPLINK TRANSMISSION

CROSS-REFERENCE TO RELATED APPLICATIONS

This application is a continuation of U.S. application Ser. No. 15/165,649, filed on May 26, 2016, which claims priority to U.S. Provisional Application No. 62/171,061, filed on Jun. 4, 2015, which applications are hereby incorporated herein by reference as if reproduced in their entireties.

TECHNICAL FIELD

The present invention relates generally to managing the allocation of resources in a network, and in particular embodiments, to techniques and mechanisms for a device and method for wideband long-term evolution (LTE) uplink transmission.

BACKGROUND

The current spectrum allocation for cellular systems is becoming inadequate in capacity as the number of users and traffic increases. While more frequency bands can be included for the cellular communication, these frequency bands are usually higher in frequency (e.g., 3.5 gigahertz (GHz)-6 GHz) than the traditional cellular bands (e.g., 1100 MHz to 2.5 GHz), typically larger in contiguous bandwidth (e.g., up to 400 MHz) compared to the typical maximum of 20 MHz, and often unpaired such that only one band may be available for transmission and reception.

SUMMARY

Technical advantages are generally achieved, by embodiments of this disclosure which describe a device and method for wideband long-term evolution (LTE) uplink transmission.

In accordance with an embodiment, a method for receiving uplink signals in a wireless network is provided, as may be performed by a base station. In this example, the method includes receiving a signal carrying at least a first single carrier frequency division multiple access (SC-FDMA) uplink transmission communicated by a first user equipment (UE). The first SC-FDMA uplink transmission spans a first set of subcarriers allocated to the first UE, subcarriers in the first set of subcarriers being non-contiguous in the frequency domain. Subcarriers in the first set of subcarriers are interleaved with subcarriers in a second set of subcarriers. The method further includes decoding the first SC-FDMA uplink transmission. An apparatus for performing this method is also provided.

In accordance with another embodiment, a method of transmitting uplink signals is provided, as may be performed by a first user equipment (UE). In this example, the method includes receiving a first frequency tone assignment from a base station, the frequency tone assignment scheduling at least a first set of subcarriers allocated to the first UE. Subcarriers in the first set of subcarriers are non-contiguous in the frequency domain; subcarriers in the first set of subcarriers are interleaved with subcarriers in a second set of subcarriers. The method further includes performing a first single carrier frequency division multiple access (SC-FDMA) uplink transmission over the first set of subcarriers. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
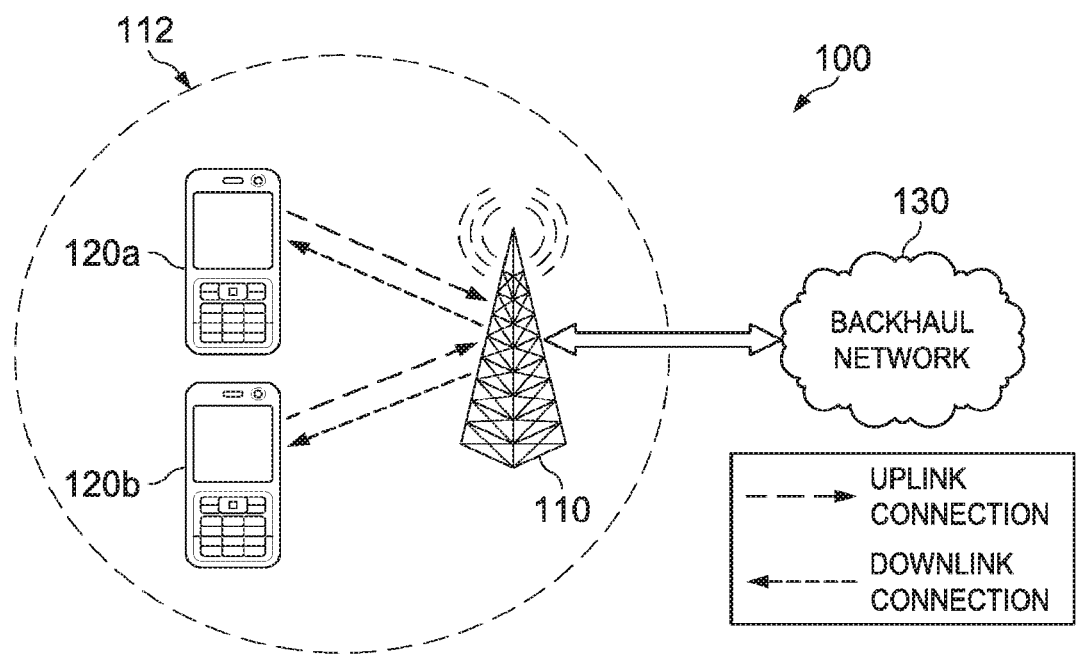
FIG. 1 illustrates a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Some frequency bands that were not utilized for cellular systems are being considered to be used for future cellular systems. To operate at these frequencies, one option is to enhance the physical layer of the existing long-term evolution (LTE) systems to operate with larger bandwidths and usually higher frequency bands. The enhanced LTE may be referred to as wideband (WB) LTE. For these high frequency bands, larger sub-carrier spacing may be used due to increased propagation path loss and smaller coverage areas, and the increased subcarrier spacing may result in shorter OFDM symbol duration. In order to reduce the packet round trip delay, shorter transmit time intervals (TTI) in terms of less OFDM symbols may be employed in a WB LTE system for earlier acknowledgement/negative-acknowledgement (ACK/NACK) transmissions. The combined effect of the shorter OFDM symbol duration and less OFDM symbols in wideband LTE may make the uplink coverage an issue since much less energy may be transmitted at a user equipment (UE) for physical Uplink Control Channel (PUCCH) messages.

In current LTE uplink transmissions, certain numbers of frequency resources at the edge of the system bandwidth reserved for PUCCH transmissions may further worsen this situation. The issue may be mitigated to some degree by uplink beamforming if a UE is equipped with multiple transmit antennas. But it may not be of much help when PUCCH transmissions suffer deep fading since the fixed transmitting frequency resource may prevent the UE from taking advantage of frequency selectivity. Thus, an uplink transmission scheme that accommodates the WB LTE frequency bands is desired.

Disclosed herein is an embodiment device and method for wideband LTE uplink transmissions. A base station may signal to a first user equipment (UE) a frequency tone assignment scheduling at least a first set of subcarriers allocated to the first UE. Subcarriers in the first set of subcarriers may be non-contiguous in the frequency domain, interleaved with subcarriers in a second set of subcarriers, and/or separated by a fixed spacing such that subcarriers in the first set of subcarriers are evenly spaced in the frequency domain. The first UE may perform a first single carrier frequency division multiple access (SC-FDMA) uplink transmission over the first set of subcarriers. When the base station receives a signal carrying the first SC-FDMA uplink transmission from the first UE, the base station may decode the first SC-FDMA uplink transmission to obtain a single data stream.

The first set of subcarriers may be mapped to a physical uplink control channel (PUCCH) or a physical uplink shared channel (PUSCH), and the first SC-FDMA uplink transmission may carry control symbols or data symbols, respectively. Subcarrier locations and a number of subcarriers of the PUCCH may be determined by the first UE based on subcarrier frequency information of a physical downlink shared channel (PDSCH) transmission from the base station. Alternatively, subcarrier locations of the PUCCH may be a priori information of the first UE or communicated to first UE in a radio resource control (RRC) message or a downlink control information (DCI) message.

The signal received by the base station may further carry a second SC-FDMA uplink transmission from a second UE. The second SC-FDMA uplink transmission may span the second set of subcarriers assigned to the second UE.

FIG. 1 illustrates a network 100 for communicating data. The network 100 comprises a base station no having a coverage area 101, a plurality of user equipments (UEs) 120, and a backhaul network 130. As shown, the base station no establishes uplink (dashed line) and/or downlink (dotted line) connections with the UEs 120, which serve to carry data from the UEs 120 to the base station no and vice-versa. Data carried over the uplink/downlink connections may include data communicated between the UEs 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. The terms "eNB" and "base station" are used interchangeably throughout this disclosure. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "UE" refers to any component (or collection of components) capable of establishing a wireless connection with a base station, such as a mobile device, a mobile station (STA), and other wirelessly enabled devices. In some embodiments, the network 100 may comprise various other wireless devices, such as relays, low power nodes, etc.

Figure 2:
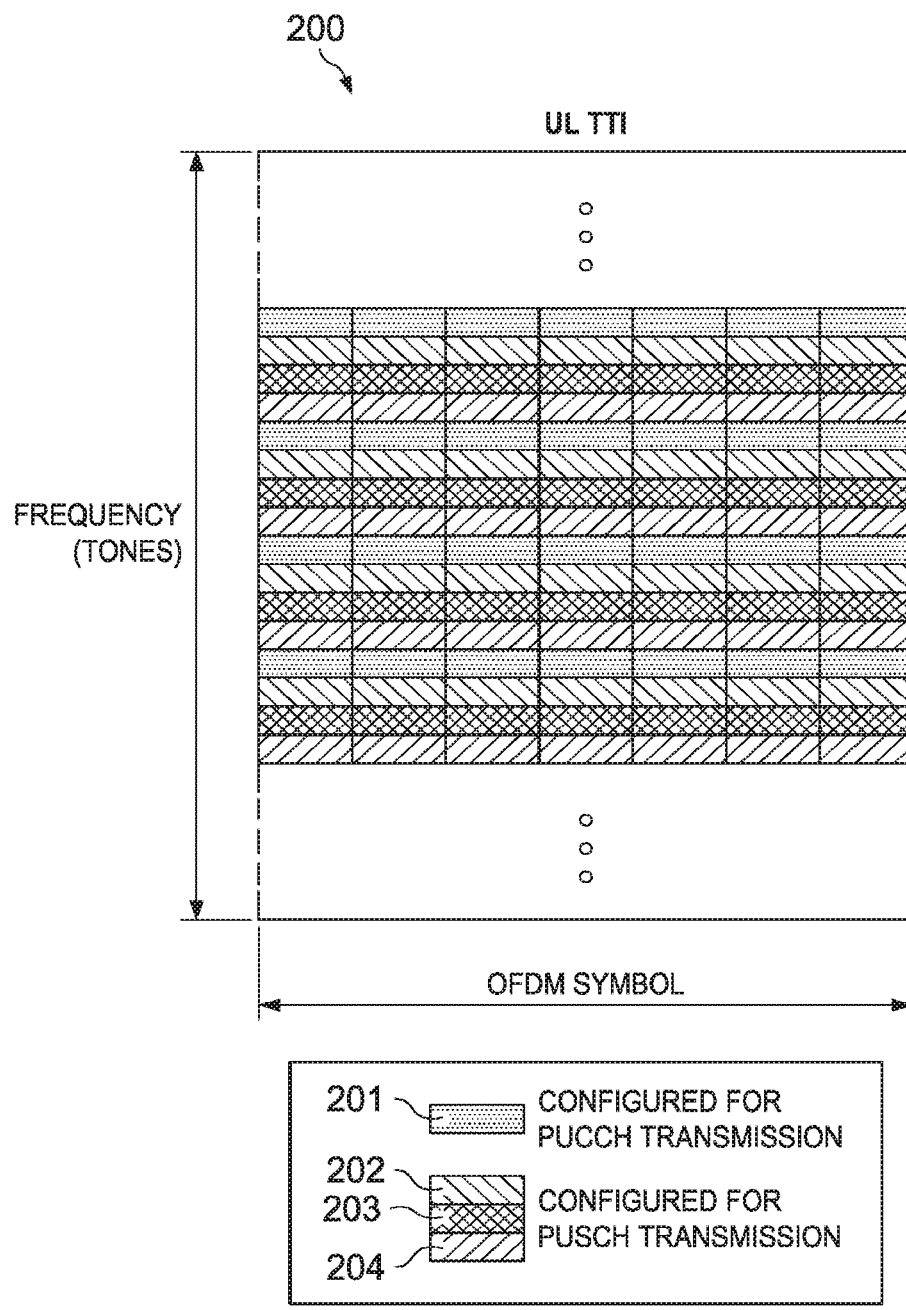
FIG. 2 illustrates a diagram of an embodiment frequency set division and assignment scheme.

FIG. 2 illustrates an embodiment scheme 200 for frequency set division and assignment. In an embodiment, the whole system bandwidth available for WB LTE uplink transmissions is divided by a network controller, such as a base station, into a predefined number of evenly spaced frequency resource sets or subcarrier sets. As shown, the whole available system bandwidth is divided into four evenly spaced subcarrier sets 201, 202, 203, 204. Subcarriers from one of the four subcarrier sets may be interleaved with subcarriers from the remaining subcarrier sets. The whole system bandwidth may be covered by the combination of all four sets of subcarriers 201, 202, 203, 204. The subcarrier spacing within one set may be four times the system subcarrier spacing. For example, when the system subcarrier spacing is 15 KHz, the subcarrier spacing within one set is 60 KHz.

Among the subcarrier sets, certain subcarrier set(s) may be designated or assigned for PUCCH transmissions and the remaining sets may be assigned for physical uplink shared channel (PUSCH) transmissions. In this example, the subcarrier set 201 is assigned for PUCCH transmissions and the other three subcarrier sets, 202, 203, 204 are designated to PUSCH transmissions. This assignment may be semi-statically changed. The semi-static frequency resource set division and mapping to PUCCH/PUSCH transmissions may be signaled by a base station to a UE through a physical layer broadest message (e.g. a master information block (MIB) or a system information block (SIB) message), a higher layer broadcast message (e.g., a radio resource control (RRC) message via the network layer), and/or some other type of message. It should be noted that even though the system bandwidth is divided into four subcarrier sets as a preferred embodiment as shown in FIG. 2, the whole system bandwidth may be divided into some other number of subcarrier sets in other embodiments.

Some amount of frequency resource at the edge of the system bandwidth may be allocated for legacy LTE PUCCH transmissions, for example in order to support a compatible mode for legacy UEs that do not support WB LTE. In this case, the remaining frequency resource of the system bandwidth may be evenly divided into a predefined number of subcarrier sets.

When PUCCH transmissions are performed on a subcarrier set, some transmission resources may be determined through predefined rules while other transmission resources may stay the same as those of legacy LTE systems. For instance, the subcarrier location and the number of subcarriers carrying the PUCCH transmission may be determined by a predefined rule, and the channel coding, modulation, sequence mapping, resource mapping, and the like may stay the same as those of legacy LTE PUCCH transmissions. Specifically, the subcarrier location, such as the starting or ending locations of the subcarriers, may be determined by a UE through a pre-defined mapping rule. In one example, the UE sends an uplink ACK/NACK for a downlink PDSCH transmission. One mapping rule may require a UE to use the starting subcarrier location of the PDSCH transmission as the starting subcarrier location for the PUCCH transmission. A second mapping rule may require the UE to use the middle subcarriers of PDSCH transmission as the subcarrier resource for the PUCCH transmission. A third mapping rule may require the UE to align the ending subcarrier location of the PDSCH transmission with the end subcarrier location of the PUCCH transmission. At least one of the above mapping rules may be pre-defined in the network for the UE to follow or may be a priori information of the UE in another way. The network may support at least one of the above mapping rules, and the UE may be signaled by the network to follow a specific mapping rule semi-statically through a RRC message or dynamically through a downlink control information (DCI) message.

In the case of DCI signaling, two bits may be signaled to a UE specifying which rule to follow based on the PDSCH scheduling grant. Table 1 shows an example of this kind of DCI signaling. Also, certain offset parameters may be signaled to the UE to add some offset in determining PUCCH subcarrier locations.

TABLE 1

| Bits in DCI | '00' | '01' | '10' | '11' |
|---|---|---|---|---|
| Mapping rule of subcarrier location | PUCCH starting subcarrier location = PDSCH starting subcarrier location | PUCCH subcarrier location occupies the middle subcarrier location of its corresponding PDSCH subcarrier location | PUCCH ending subcarrier location = PDSCH ending subcarrier location | Other feasible mapping rule |

The number of subcarriers carrying the PUCCH transmission may be determined through pre-defined mapping rules and/or signaling. The mapping rule may determine the number of subcarriers based on PDSCH transmission parameters, such as modulation and coding scheme (MCS) values, the number of multiple-input and multiple-output (MIMO) layers, and/or the number of ACK/NACK bits to send. One example is that the MCS values and the number of MIMO layers of a PDSCH transmission together is mapped to a certain coding rate; the coding rate and the number of ACK/NACK bits may be used to calculate the number of subcarriers needed for the PUCCH transmission. In the case of signaling, the number of subcarriers used for the PUCCH transmission is signaled to a UE through a semi-static RRC message or through a dynamic DCI message. Tables 2 and 3 show two examples of DCI signaling on the number of subcarriers to use for UE uplink transmissions.

TABLE 2

| Bits in DCI | '00' | '01' | '10' | '11' |
|---|---|---|---|---|
| Mapping rule of number of subcarriers for uplink transmission | 2 resource blocks | 4 resource blocks | 8 resource blocks | 16 resource blocks |

TABLE 3

| Bits in DCI | '00' | '01' | '10' | '11' |
|---|---|---|---|---|
| Mapping rule of number of subcarriers for uplink transmission | Code rate = 1/5 | Code rate = 2/5 | Code rate = 1/2 | Code rate = 3/5 |

The channel coding, modulation, sequence mapping, resource mapping, and the like of legacy LTE PUCCH transmissions may be used for the WB LTE PUCCH transmission. Alternatively, the LTE PUSCH chain of channel coding, modulation, and the like may be adopted for WB LTE uplink transmissions. One example is to use a tail-biting convolution code for the WB LTE ACK/NACK bit channel coding and quadrature phase shift keying (QPSK) for the WB LTE modulation.

The WB uplink transmission may take continuous subcarriers within a subcarrier set to maintain single carrier kind of peak to average power ratio (PAPR) characteristics. For instance, the embodiment uplink transmission scheme may show PAPR characteristic similar to those of the single carrier-frequency-division multiple access (SC-FDMA) scheme. In the case where multiple PDSCH hybrid automatic repeat request (HARQ) entities need to perform ACK/NACK for a UE, multiple corresponding WB uplink messages may be multiplexed in the frequency domain onto continuous subcarriers within the subcarrier set assigned to the PUCCH transmission. Thus although there may be multiple PUCCH messages transmitted over multiple subcarriers at the same time for a UE, the PUCCH transmissions may maintain the single carrier kind of PAPR characteristics. For WB uplink transmissions on a subcarrier set, the LTE legacy PUCCH and PUSCH power control may be used.

In the case of PUSCH transmissions on a subcarrier set, transmission resources, such as location of the subcarriers, the number of subcarriers, coding, and the like, are signaled through DCI messages. The PUSCH transmissions may be on continuous subcarriers within a subcarrier set assigned to PUSCH transmissions and/or a scheduled frequency range. The subcarrier set may be semi-statically configured for UE through RRC signaling or dynamically configured through DCI messages. In the case where no PUCCH transmission is performed in a UE preferred frequency range, the UE may be scheduled to perform PUSCH transmissions on continuous subcarriers across all the available subcarrier sets, for instance in order to increase the data rate. This scheduling information may be signaled to the UE through a DCI message, e.g. by indicating that the subcarrier set typically designated for PUCCH transmissions is now designated for uplink PUSCH transmissions.

Figure 3:
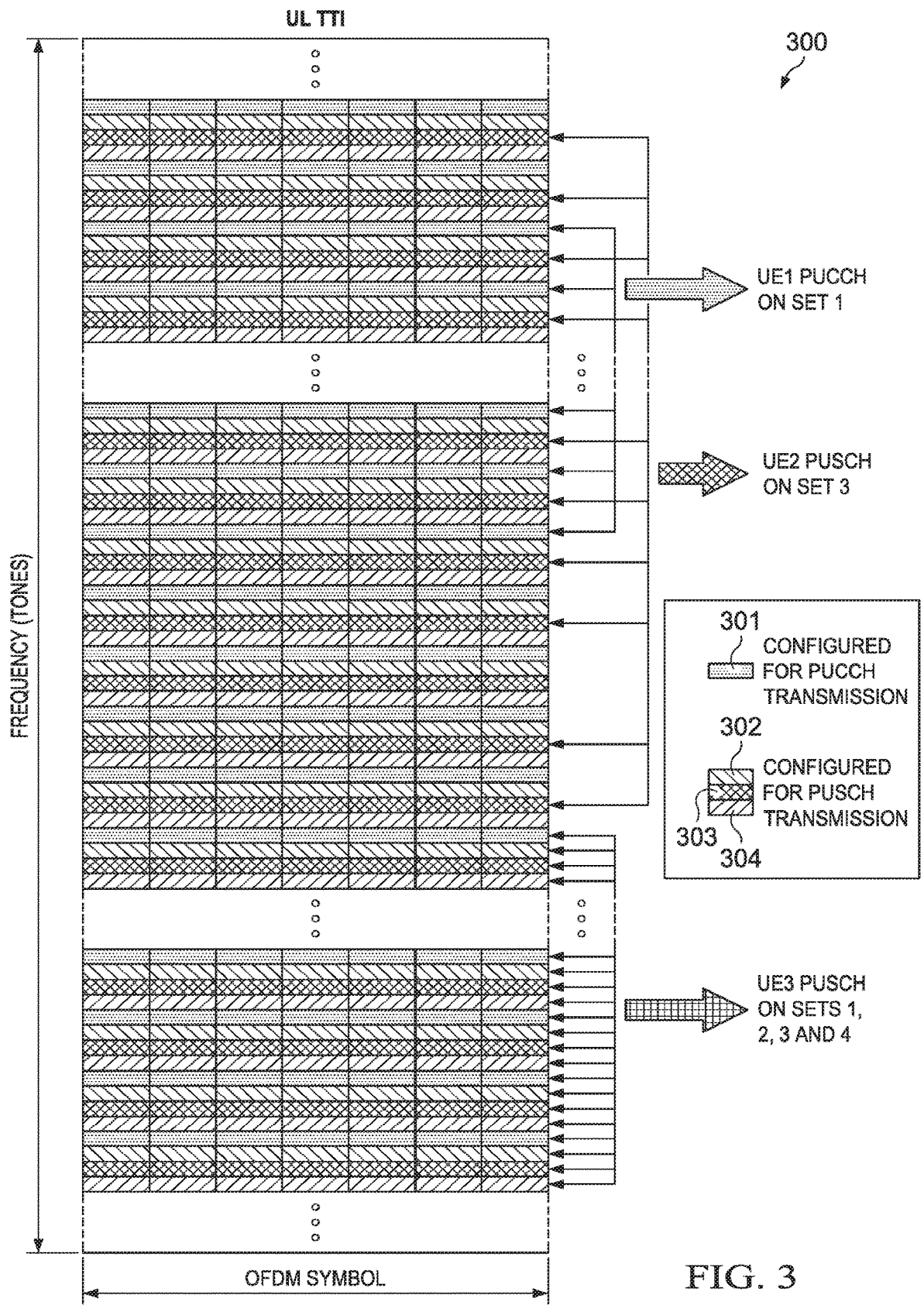
FIG. 3 illustrates a diagram of an embodiment frequency set division and assignment scheme for three user equipments (UEs)

FIG. 3 illustrates an embodiment frequency set division and assignment scheme 300 for three user equipments (UEs). As shown, the system bandwidth is divided into four evenly spaced frequency resource sets or subcarrier sets. One set 301 may be designated to PUCCH transmissions and the other three sets 302, 303, 304 may be designated to PUSCH transmissions. UE1 may transmit PUCCH messages on the subcarrier set 301, and UE2 may transmit PUSCH messages on the subcarrier set 303. While the subcarriers used for UE1 and UE2 are interleaved, both UE1 and UE2 may maintain the single carrier kind of PAPR characteristics of their waveforms. For UE3, since there is no PUCCH transmissions within the frequency range of its preferred frequency band, UE3 may be scheduled to perform PUSCH transmissions on the continuous subcarriers across all of these four subcarrier sets 301, 302, 303, 304. It should be noted that although LTE systems are described herein as a preferred embodiment, the technology disclosed in the present disclosure may be applicable in other systems such as HSPA systems, WiFi systems, etc.

Figure 4:
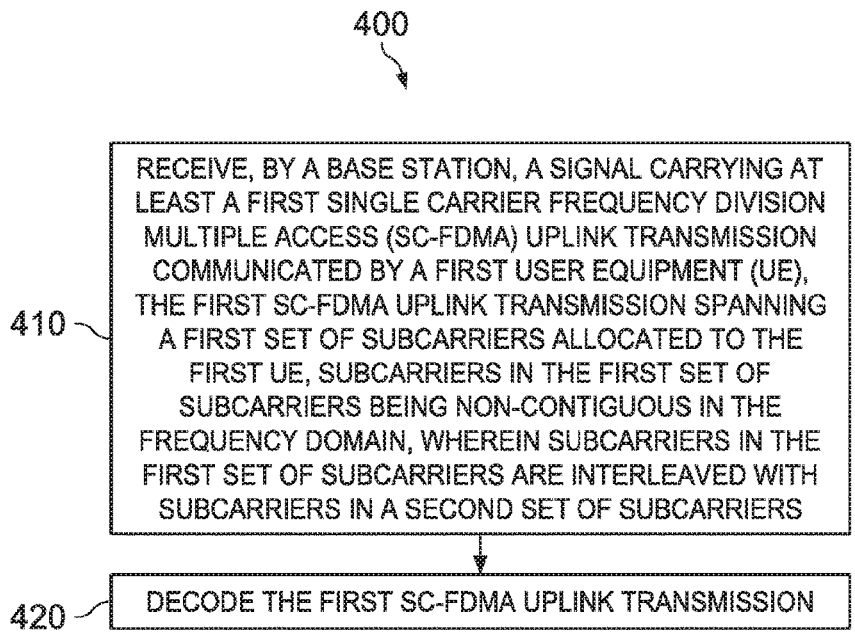
FIG. 4 illustrates a flowchart of an embodiment method for WB LTE uplink transmissions.

FIG. 4 illustrates an embodiment method 400 for WB LTE uplink transmissions, as may be performed by a base station. As shown, the method 400 begins at step 410, where the base station receives a signal carrying at least a first single carrier frequency division multiple access (SC-FDMA) uplink transmission communicated by a first user equipment (UE). In an embodiment, the first SC-FDMA uplink transmission spans a first set of subcarriers allocated to the first UE. Subcarriers in the first set of subcarriers may be non-contiguous in the frequency domain and/or interleaved with subcarriers in a second set of subcarriers. Thereafter, the method 400 proceeds to step 420, where the base station decodes the first SC-FDMA uplink transmission.

Figure 5:
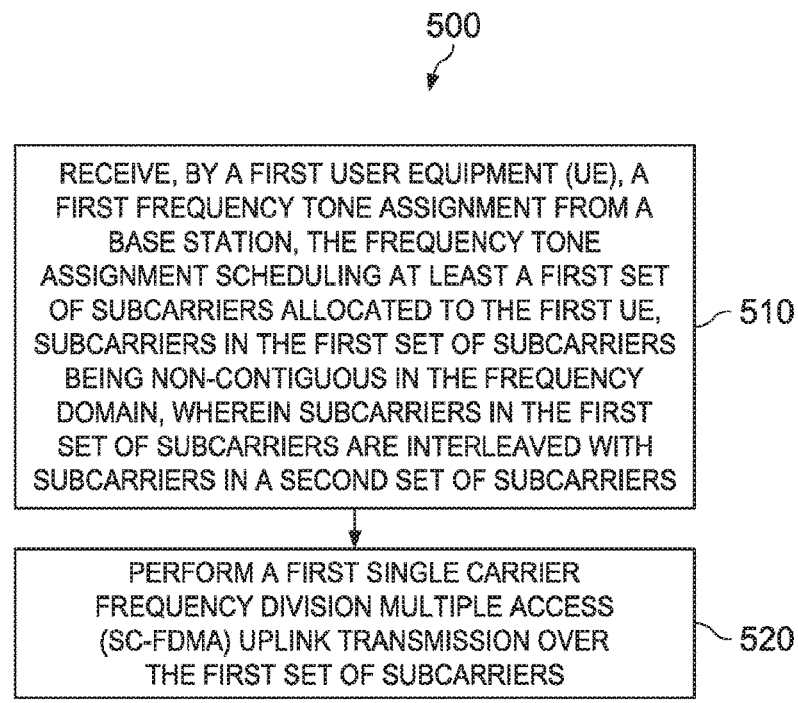
FIG. 5 illustrates a flowchart of another embodiment method for WB LTE uplink transmissions.

FIG. 5 illustrates an embodiment method 500 for WB LTE uplink transmissions, as may be performed by a user equipment (UE). As shown, the method 500 begins at step 510, where a first UE receives a first frequency tone assignment from a base station. In an embodiment, the frequency tone assignment schedules at least a first set of subcarriers allocated to the first UE. Subcarriers in the first set of subcarriers may be non-contiguous in the frequency domain and/or interleaved with subcarriers in a second set of subcarriers. Thereafter, the method 500 proceeds to step 520, where the first UE performs a first single carrier frequency division multiple access (SC-FDMA) uplink transmission over the first set of subcarriers.

A second UE may be assigned with the second set of subcarriers in the first frequency tone assignment or in a second frequency tone assignment from the base station. The second UE may perform a second SC-FDMA uplink transmission, the second SC-FDMA uplink transmission spanning the second set of subcarriers.

Figure 6:
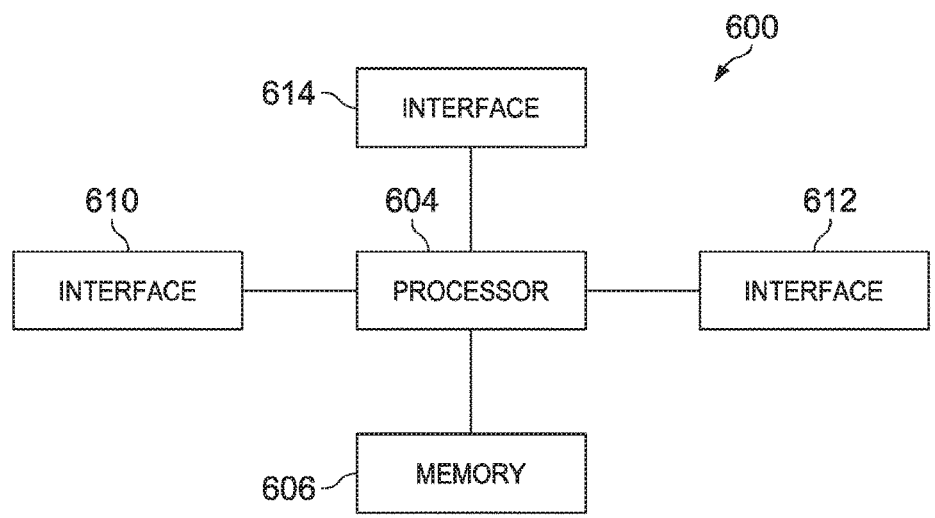
FIG. 6 illustrates a diagram of an embodiment processing system.

FIG. 6 illustrates a block diagram of an embodiment processing system 600 for performing methods described herein, which may be installed in a host device. As shown, the processing system 600 includes a processor 604, a memory 606, and interfaces 610-614, which may (or may not) be arranged as shown in FIG. 6. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in FIG. 6, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 7:
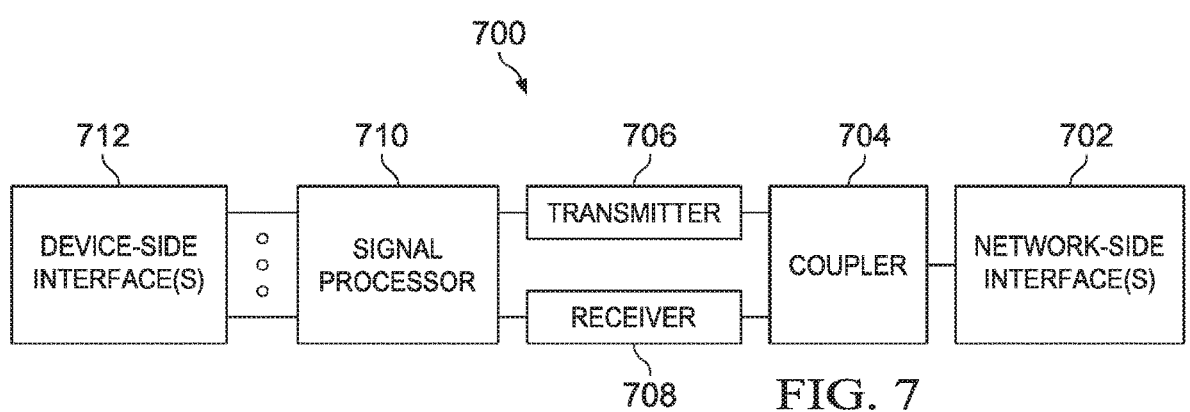
FIG. 7 illustrates a diagram of an embodiment transceiver.

In some embodiments, one or more of the interfaces 610, 612, 614 connects the processing system 600 to a transceiver adapted to transmit and receive signaling over the telecommunications network. FIG. 7 illustrates a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a decoding unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for receiving uplink signals in a wireless network, the method comprising:
    signaling, by a base station to a first user equipment (UE), a first UE frequency tone assignment that schedules a first set of subcarriers allocated to the first UE, the first set of subcarriers comprising a plurality of subcarriers evenly spaced in a frequency domain, a first subcarrier of the first set of subcarriers being non-contiguous in the frequency domain from other subcarriers of the first set of subcarriers;
    receiving, by the base station, a first single carrier frequency division multiple access (SC-FDMA) uplink transmission from the first UE over the first set of subcarriers;
    signaling, by the base station to a second UE, a second UE frequency tone assignment that schedules a second set of subcarriers allocated to the second UE, subcarriers of the second set of subcarriers being interleaved with subcarriers of the first set of subcarriers; and
    receiving, by the base station, a second SC-FDMA uplink transmission from the second UE over the second set of subcarriers.

2. The method of claim 1, wherein the first set of subcarriers is mapped to a physical uplink control channel (PUCCH) and the first SC-FDMA uplink transmission comprises control symbols.

3. The method of claim 2, further comprising:
    transmitting, by the base station, data over a physical downlink shared channel (PDSCH) before receiving the first SC-FDMA uplink transmission, wherein subcarrier locations of the PUCCH are determined by the first UE based on an edge subcarrier frequency of the PDSCH or a center subcarrier frequency of the PDSCH.

4. The method of claim 2, further comprising:
    transmitting, by the base station, data over a physical downlink shared channel (PDSCH) before receiving the first SC-FDMA uplink transmission, wherein a number of subcarriers in the PUCCH is determined by the first UE based on a transmission parameter of the PDSCH.

5. The method of claim 4, wherein a number of subcarriers in the PUCCH is determined by the first UE based on at least one of a modulation and coding scheme (MCS) parameter used to transmit the PDSCH, a number of multiple-input and multiple-output (MIMO) layers in the PDSCH, or a number of acknowledgement/negative-acknowledgement (ACK/NACK) to be sent for confirming reception of the PDSCH.

6. The method of claim 1, wherein the first set of subcarriers is mapped to a physical uplink shared channel (PUSCH) and the first SC-FDMA uplink transmission comprises data symbols.

7. The method of claim 1, wherein the first set of subcarriers is mapped to a physical uplink control channel (PUCCH), subcarrier locations and a number of subcarriers of the PUCCH being determined by the first UE based on subcarrier frequency information of a physical downlink shared channel (PDSCH) transmission from the base station.

8. The method of claim 1, wherein the first set of subcarriers is mapped to a physical uplink control channel (PUCCH), with subcarrier locations and a number of subcarriers of the PUCCH comprising a priori information of the first UE.

9. The method of claim 1, wherein the first set of subcarriers is mapped to a physical uplink control channel (PUCCH), with subcarrier locations and a number of subcarriers of the PUCCH being communicated to the first UE in a radio resource control (RRC) message.

10. The method of claim 1, wherein the first set of subcarriers is mapped to a physical uplink control channel (PUCCH), with subcarrier locations and a number of subcarriers of the PUCCH being communicated to the first UE in a downlink control information (DCI) message.

11. A base station configured to receive uplink signals in a wireless network, the base station comprising:
    a processor; and
    a non-transitory computer readable storage medium coupled to the processor and storing programming for execution by the processor, the programming including instructions to:
        signal to a first user equipment (UE) a first UE frequency tone assignment that schedules a first set of subcarriers allocated to the first UE, the first set of subcarriers comprising a plurality of subcarriers evenly spaced in a frequency domain, a first subcarrier of the first set of subcarriers being non-contiguous in the frequency domain from other subcarriers of the first set of subcarriers;
        receive a first single carrier frequency division multiple access (SC-FDMA) uplink transmission from the first UE over the first set of subcarriers;
        signal to a second UE, a second UE frequency tone assignment that schedules a second set of subcarriers allocated to the second UE, subcarriers of the second set of subcarriers being interleaved with subcarriers of the first set of subcarriers; and
        receive a second SC-FDMA uplink transmission communicated by the second UE over the second set of subcarriers.

12. The base station of claim 11, wherein the processor further executes the programming to map the first set of subcarriers to a physical uplink control channel (PUCCH), with the first SC-FDMA uplink transmission comprising control symbols.

13. The base station of claim 12, wherein the processor further executes the programming to:
    transmit data over a physical downlink shared channel (PDSCH) before receiving the first SC-FDMA uplink transmission, wherein subcarrier locations of the PUCCH are determined by the first UE based on an edge subcarrier frequency of the PDSCH or a center subcarrier frequency of the PDSCH.

14. The base station of claim 12, wherein the processor further executes the programming to:

transmit data over a physical downlink shared channel (PDSCH) before receiving the first SC-FDMA uplink transmission, wherein a number of subcarriers in the PUCCH is determined by the first UE based on a transmission parameter of the PDSCH.

15. The base station of claim 14, wherein a number of subcarriers in the PUCCH is determined by the first UE based on at least one of a modulation and coding scheme (MCS) parameter used to transmit the PDSCH, a number of multiple-input and multiple-output (MIMO) layers in the PDSCH, or a number of acknowledgement/negative-acknowledgement (ACK/NACK) to be sent for confirming reception of the PDSCH.

16. The base station of claim 11, wherein the processor further executes the programming to map the first set of subcarriers to a physical uplink shared channel (PUSCH), with the first SC-FDMA uplink transmission comprising data symbols.

17. The base station of claim 11, wherein the processor further executes the programming to map the first set of subcarriers to a physical uplink control channel (PUCCH), with subcarrier locations and a number of subcarriers of the PUCCH being determined by the first UE based on subcarrier frequency information of a physical downlink shared channel (PDSCH) transmission from the base station.

18. The base station of claim 11, wherein the processor further executes the programming to map the first set of subcarriers to a physical uplink control channel (PUCCH), with subcarrier locations and a number of subcarriers of the PUCCH comprising a priori information of the first UE.

19. The base station of claim 11, wherein the processor further executes the programming to map the first set of subcarriers to a physical uplink control channel (PUCCH), with subcarrier locations and a number of subcarriers of the PUCCH being communicated to the first UE in a radio resource control (RRC) message.

20. The base station of claim 11, wherein the processor further executes the programming to map the first set of subcarriers to a physical uplink control channel (PUCCH), with subcarrier locations and a number of subcarriers of the PUCCH being communicated to the first UE in a downlink control information (DCI) message.

21. The base station of claim 11, wherein the subcarriers of the second set of subcarriers are contiguously interleaved with the subcarriers of the first set of subcarriers.

22. The method of claim 1, wherein the subcarriers of the second set of subcarriers are contiguously interleaved with the subcarriers of the first set of subcarriers.

* * * * *